United States Patent [19]

Shelton et al.

[11] Patent Number: 4,780,961

[45] Date of Patent: Nov. 1, 1988

[54] PROBE ASSEMBLY AND CIRCUIT FOR MEASURING MACHINE

[76] Inventors: Russell S. Shelton, 9 Park Ave.; Michael J. Schaffer, 7 Main St., both of Flanders, N.J. 07836

[21] Appl. No.: 928,353

[22] Filed: Nov. 10, 1986

[51] Int. Cl.⁴ .............................................. G01B 7/02
[52] U.S. Cl. .................... 33/503; 33/169 R; 33/172 E; 33/559
[58] Field of Search .................. 33/169 R, 503, 504, 33/1 M, 172 E, 559

[56] References Cited

U.S. PATENT DOCUMENTS

| | | |
|---|---|---|
| 3,945,124 | 3/1976 | Jacoby et al. |
| 3,953,133 | 4/1976 | Jacoby . |
| 4,138,823 | 2/1979 | McMurtry ................. 33/559 X |
| 4,333,238 | 6/1982 | McMurtry . |
| 4,451,892 | 5/1984 | McMurtry . |
| 4,451,987 | 6/1984 | Cusack ................... 33/561 |
| 4,462,162 | 7/1984 | McMurtry . |

Primary Examiner—Harry N. Haroian
Attorney, Agent, or Firm—Beveridge, DeGrandi & Weilacher

[57] ABSTRACT

A probe assembly has a housing connected to the head of a coordinate measuring machine, a carrier movably connected to the housing, and a piezoelectric crystal mounted on the carrier. A stylus is mounted on the carrier. An electronic circuit receives signals from the crystal and, at an adjustable threshold value, the circuit provides output signals which are greater than and substantially simultaneous with signals from the crystal. A timer maintains the output signal for a time interval after the signal is produced by the crystal.

40 Claims, 4 Drawing Sheets

PROBE ASSEMBLY AND CIRCUIT FOR MEASURING MACHINE

BACKGROUND OF THE INVENTION

This invention relates to measuring machines, and primarily to coordinate measuring machines in which a probe is used to connect a stylus to the head of the machine.

The probes according to the invention are of the digital type in that they provide change from an "off" state to an "on" state when the stylus touches a workpiece. In a conventional manner, the signals from the probe are delivered to the circuitry of the coordinate measuring machine which then records its scale values in the x, y and z directions upon receiving the initial signal from the probe.

Digital probes presently in use suffer from certain inaccuracies which are believed to be avoided by the present invention. In this respect, the accuracy of a digital probe may be defined as the difference in the amount of displacement in all directions required for it to signal contact with the workpiece, plus the amount of variation in its ability to re-seat itself, i.e. return to its "home" or normal rest position.

The most commonly used digital probes require the stylus to pivot away from its normal rest position before a signal is generated. When such pivotal movement occurs, the signal is generated either by a circuit going through the seats which support the stylus in its normal rest position, or by displacing an internal LvDT which creates a trigger voltage.

Since existing probes require some movement of the probe carrier before a signal is provided, they have inherent inaccuracies, and these inaccuracies are not equal for all directions of movement. For example, the phenomenon referred to as EPD, an abbreviation for "effective ball diameter," the workpiece-contacting ball at the tip of the stylus appears to be smaller than it is, simply because the ball must move before a signal is sent to the position recording components of the machine. If the length of the stylus is greater than the radially measured distance between the pivot axis of the probe, the ball size perpendicular to the probe axis is affected more than the size parallel to the axis, thus giving an apparent and inaccurate egg shaped measuring pattern.

Another inaccuracy results when the ball at the tip of the probe must travel further in some directions than in others before a signal is generated. This occurs, for example, when a probe carrier is supported on three seats which are disposed around and spaced from the probe carrier axis. If a measurement is triggered only when the probe carrier becomes unseated at one of the locations, it will be apparent that the amount of movement required to trigger a signal will depend in part on the radial direction at which the probe is moved against the workpiece.

Due to the types of inaccuracies mentioned above, it is a practice in the metrology field for a user first to calibrate the stylus ball while moving in only one direction, and then to perform measurements only when moving in this calibrated direction.

The present invention avoids the inaccuracies described above because a measurement-triggering signal is generated substantially at the moment of contact, i.e. less than one hundred nanoseconds from the instant of contact. This signal occurs before the stylus is displaced. The repeatability of measurements is improved because the probe-positioning seats can be selected purely for suitable hardnesses and friction properties and, because they do not form a component of the electrical trigger switch, they are not subject to electrical arcing.

The invention also provides a number of additional benefit from the standpoint of the simplicity and accuracy of the electrical circuits, the adjustability of sensitivity, the electrical connectors associated with a coordinate measuring machine, and other advantages.

SUMMARY OF THE INVENTION

In one respect, the present invention involves a probe assembly for connecting a stylus to the head of a coordinate measuring machine and for sensing the position where the stylus touches a workpiece. The assembly includes a housing, means for connecting the housing to the head of a coordinate measuring machine, a carrier which is supported on the housing, and means for connecting a workpiece-contacting stylus to the carrier. Positioning means are provided for retaining the carrier at a precise normal rest position relative to the housing, and this carrier is movable from the rest position when it is subjected to external forces. The novel aspect of the assembly is the provision therein of a piezoelectric crystal means which is mounted on the carrier and is operable to produce a signal when the carrier receives an impact from the stylus and before the carrier moves from its rest position.

In another respect, the invention involves a measuring apparatus in which a piezoelectric crystal produces a signal when its carrier receives an impact. The apparatus has an electronic circuit which receives the signal and provides an output signal which is greater than and substantially simultaneous with the signal from the crystal, and adjustable means are provided for changing the threshold value of the signal from the crystal means at which the electronic circuit will provide an output signal. Preferably, the electronic circuit includes an absolute value circuit, and it includes a voltage comparator with a potentiometer connected thereto. The potentiometer is adjustable to change the threshold value of the signal from the crystal at which the electronic circuit will provide an output signal. The circuit also includes timer means which are described below.

The invention also involves a measuring apparatus in which an operational amplifier is associated with a contact-detecting piezoelectric crystal means. More specifically, there is at least one operational amplifier for amplifying the signal from the crystal means, and there is a capacitor for connecting the crystal means to the operational amplifier.

In another respect, the invention is applicable to measuring apparatus in which one or more timers are utilized in the electronic circuitry associated with a piezoelectric crystal contact-detecting device. In this instance, this electronic circuit receives a signal from the piezoelectric crystal and provides an output signal which is greater than and substantially simultaneous with the signal from the crystal. The circuit includes a first timer means for maintaining an output signal for a first time interval after the signal is produced by the crystal. The first timer means is preferably adjustable to change the duration of the first time interval, and the first timer means is arranged to maintain an output signal for a sufficient period of time so that the head of the measuring machine will be able to move until the crystal-supporting carrier moves from its normal rest position. A second timer means may also be provided to permit the transmission of an output signal from the circuit for a second time interval, this second timer means being actuated at the end of the first time interval so that there will be no output signal when the carrier arrives back at its normal rest position.

Numerous other important features are used in the invention. For example, the preferred version of the probe includes a movement sensing means which, after the signal is produced by the crystal, detects the displacement of the carrier from its normal rest position. Another feature involves the provision of an upper end cap of the housing which has an insulating member and at least three concentric rings of conductive material supported on the insulating member. This structure is used to make electrical connections between the probe and the head of a measuring machine, the latter also being provided with concentric conductors which engage those on the upper end cap.

DETAILED DESCRIPTION

Figure 1:
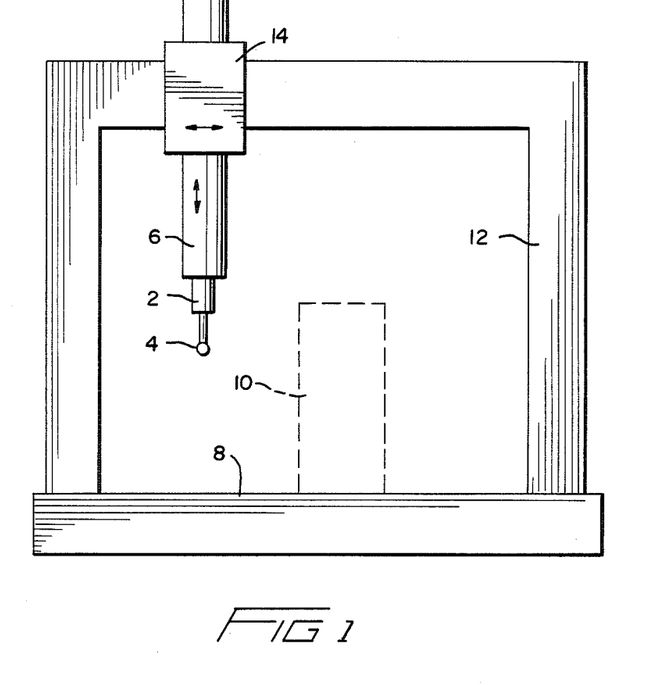
FIG. 1 is a somewhat diagrammatic view of a coordinate measuring machine for which the present invention is suited.

FIG. 1 shows a coordinate measuring machine in which a probe 2 connects a stylus 4 to the head 6 of the machine. The machine has a base 8 for supporting a workpiece 10, and the stylus 4 is moved in three mutually perpendicular linear directions until it contacts the workpiece 10, at which time the position of the probe is detected and recorded. Probe movement in one horizontal direction is provided by a longitudinal carriage 12; movement in the other horizontal direction is provided by the transverse carriage 14; and, vertical movement is provided by the connection between the head 6 and the carriage 14. To this extent, the measuring machine is conventional.

Figure 2:
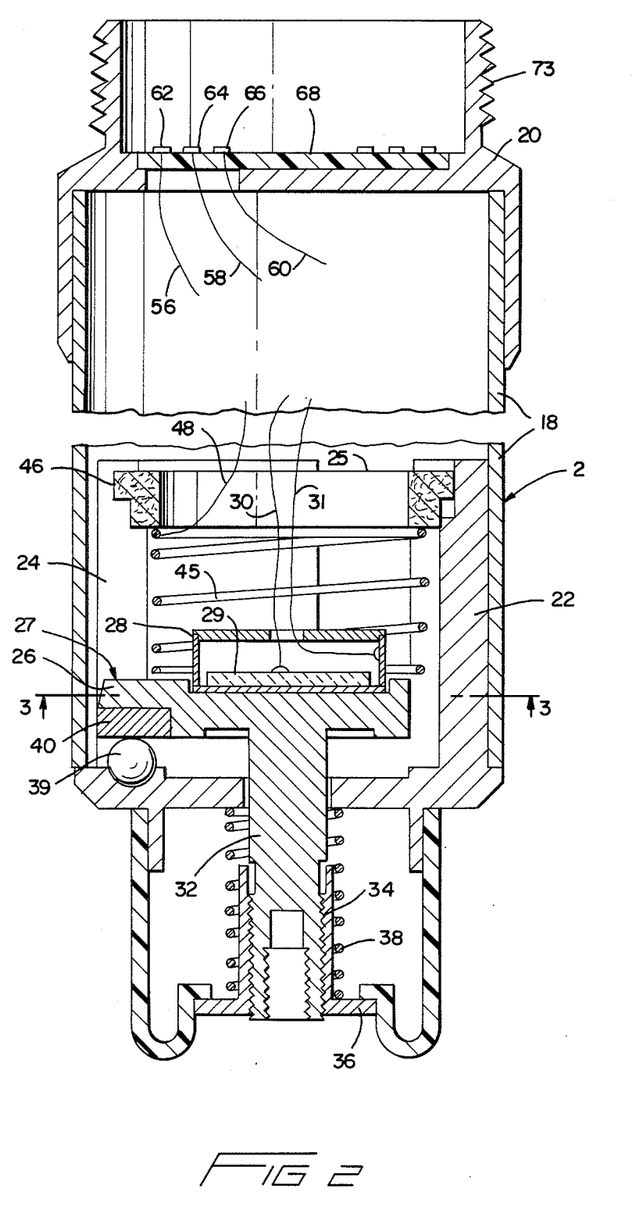
FIG. 2 is an enlarged sectional view of a probe constructed according to the invention.
Figure 3:
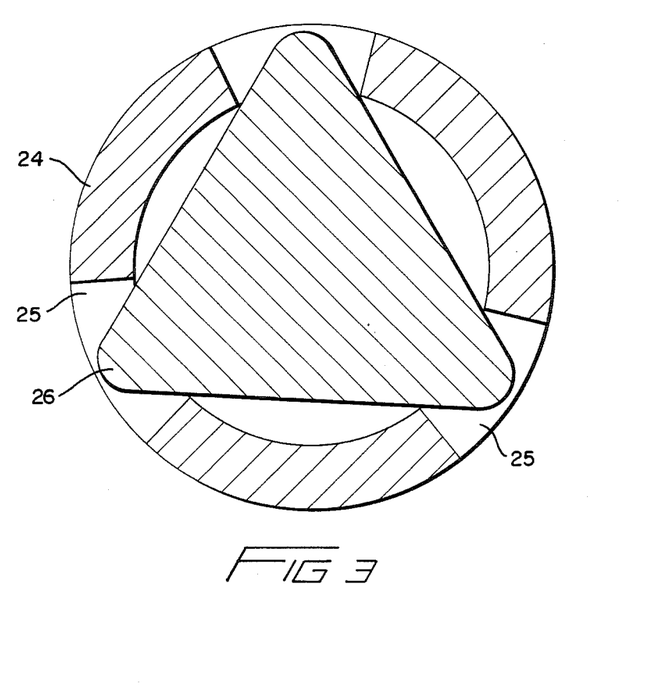
FIG. 3 is a sectional view of portions of the probe as seen along the line 3—3 in FIG. 2.
Figure 4:
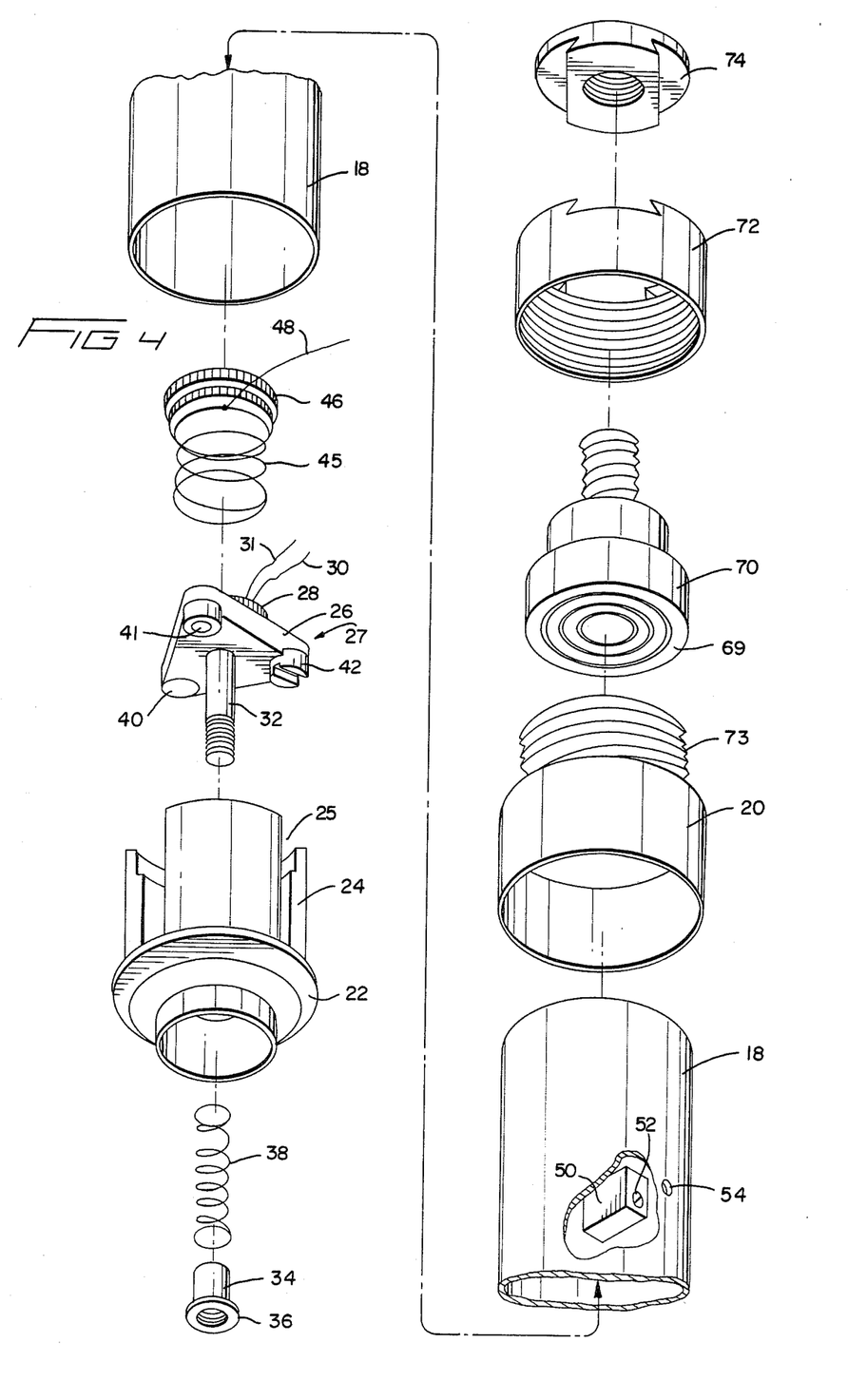
FIG. 4 is an exploded view of the probe.

Details of the probe can be seen in FIGS. 2 and 3. It includes a tubular housing 18 provided with an upper end cap 20 and a lower end cap 22. The lower end cap includes an upper cylindrical section which fits telescopically into the cylinder 18, and this cylindrical section has longitudinal grooves 25 as can be seen in FIGS. 3 and 4. These grooves receive the apex sections of a triangular plate 26 of a carrier 27. This triangular plate 26 is supported on the lower end cap 22 at a normal rest position which is defined by a Kelvin locator, the details of which are described below. A small can 28 is affixed to the upper surface of the plate 26, and this can contains a piezoelectric crystal 29 which generates an electrical signal whenever the carrier 27 receives an impact as, for example, when the stylus 4 contacts the surface of a workpiece 10. Electrical leads 30 and 31 extend from the crystal to a small circuit board within the housing 18. This circuit board carries an electronic circuit where signals from the crystal are amplified and otherwise processed as will be described subsequently in this specification.

A shaft or shank 32 is integral with and extends downwardly from the triangular plate 26. The shank extends through an opening in the lower end of cap 22, and it is externally threaded to receive a T-nut 34. The horizontal flange 36 at the lower end of the T-nut 34 bears against the lower end of a helical compression spring 38, the upper end of which bears against the downwardly-facing surface of the cap 22, thereby biasing the carrier 27 downwardly.

The Kelvin locator which establishes the normal rest position of the carrier includes three balls or spheres which are disposed at equal angular spacing with respect to the central axis of the lower end cap 22. One such ball is designated 39 in FIG. 2. Three locator pads 40, 41 and 42 are mounted on the triangular plate 26 of the carrier, and the configurations of these pads are best shown in FIG. 4. One pad 40, seen also in FIG. 2, is flat; one pad 41 has a conical ball-engaging recess, and the other pad 42 has a recess which extends diametrically thereacross and has a groove which is V-shaped in transverse cross section. This cone-vee-flat type of locator is a public domain device known in the metrology field to provide accurate and repeatable repositionings of members. With it, the downward force exerted on the carrier 27 by the spring 38 causes the pads of the Kelvin locator to engage the respective balls on the interior of the lower end cap to locate the carrier precisely.

In order to detect when the carrier has moved vertically by a certain distance, the apparatus is provided with a helical spring 45 with a flat lower end. The upper end of this spring is bonded to or embedded in a ring 46 which is formed of electrical insulating material and bonded by a suitable adhesive to the interior wall of the lower end cap 22. An electrical conductor 48 is connected to spring 45. As can be seen in FIG. 2, there is a small gap between the triangular plate 26 of the carrier and the lower end of the spring 45. However, if the plate 26 moves upwardly by axial or tilting movement, it will contact the lower edge of the spring 45 to close an electrical circuit between the conductors 31 and 48, thereby providing a signal indicating that such movement has occurred.

Figure 5:
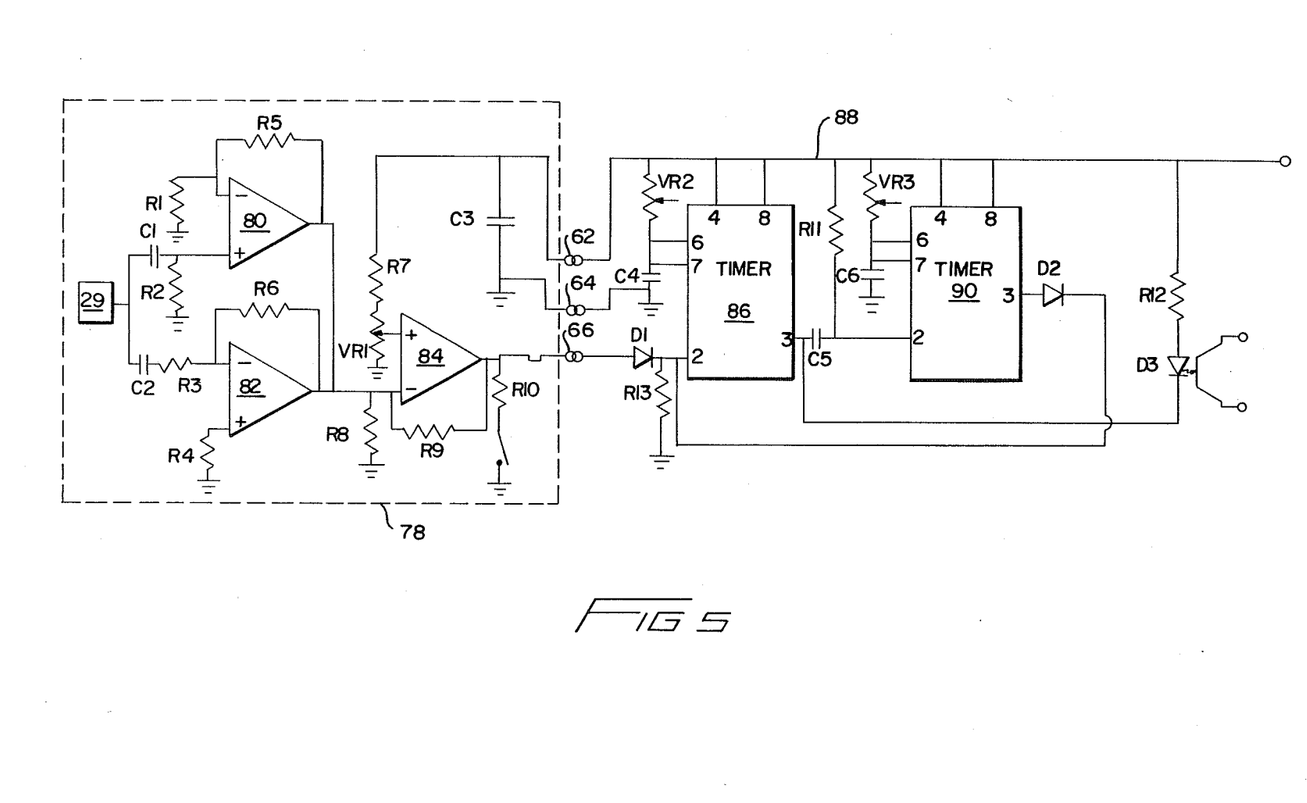
FIG. 5 is a diagram of an electronic circuit used in connection with the invention.

The conductors 30, 31 and 48 provide the inputs to an electronic circuit which is illustrated in FIG. 5. Many components of this circuit are mounted on a printed circuit board which is located inside the housing, and one of these components is a potentiometer 50 shown in FIG. 4. This potentiometer has a miniature screw head 52 which can be rotated to adjust the resistance of the potentiometer and to adjust the sensitivity of the apparatus. In order to permit such adjustments when the probe is installed on a machine, the cylindrical body of the housing has a small hole 54 which is aligned with the screw head. This enables the user of the apparatus to insert a small screwdriver to turn the screw head and adjust the potentiometer to change the sensitivity of the probe.

The upper end of the circuit board is connected by conductors 56, 58 and 60 to three concentric rings 62, 64 and 66 of conductive material which are located on a body of electrical insulating material 68 in the upper end of the cap 20. A similar set of conductors is also formed on an insulating member 69 of the upper connector assembly 70 which can be seen in FIG. 4.

The upper connector assembly 70 has an internally threaded collar 72 which is engageable with the external threads 73 of the upper end cap 20 so that the collar can be tightened downwardly to provide firm electrical contact between the concentric ring conductors on the members 68 and 69. At the upper end of the member 69, there is an adaptor which includes a disc portion 74 and a threaded shank which has a central electrically insulated pin. The three conductive paths from the rings to the adaptor lead, respectively, to the disc, to the threaded shank, and to the central pin.

The use of concentric conductors is particularly useful when the stylus ball is laterally offset from the probe axis, and the user desires to shift the radial position of the stylus ball. The collar 72 is loosened and rotated until the stylus is at the desired orientation. Then, the collar is retightened to hold the probe and stylus in position and to reestablish the electrical connections through the concentric rings.

The adapter is engaged with a threaded female connector such as those presently provided in the heads of coordinate measuring machines. To facilitate hand tightening of the adaptor into the head of a coordinate measuring machine, the lower surface of the disc 74 has a diametrical ridge which is axially insertable in a correspondingly-shaped diametrical groove formed in the upper surface of the collar 72. Thus, before the upper end cap 20 is threaded into the collar 72, the collar may be held by the user's fingers, moved upwardly until the collar's diametrical groove mates with the disc's diametrical ridge, and the collar is turned by hand to screw the adaptor into the head. This avoids the need for a separate wrench. The sloped dovetail-like edges on the groove and ridge deter inadvertent disengagement of the ridge from the groove during this tightening operation. After the adapter is securely tightened to the head, the collar is lowered so it is disengaged from the disc, and the collar is threaded onto the upper end cap 20 until the collar holds the conductive rings of member 68 against those of member 69.

When the coordinate measuring machine is in operation, whenever the stylus 4 contacts a workpiece 10, the impact will be transmitted to the piezoelectric crystal 29 to produce a signal indicating that contact has been made. This signal occurs before the carrier 27 moves from its rest position, and it occurs at substantially the same instant in time whether the direction of impact is parallel or perpendicular to the shank 32 of the carrier 27. Due to these characteristics, the probe constructed according to the invention does not have any errors which would otherwise exist due to the diminished apparent ball diameter or pretravel variation as would be the case if the apparatus relied upon displacement of the locator pads from the balls.

The electronic circuitry associated with the invention is illustrated in FIG. 5. It includes an absolute value amplifier circuit 78 which receives signals from the piezoelectric crystal 29, amplifies it and then transmits any amplified signal which reaches a threshold value to provide an output signal which triggers the recordation of the probe's position. The amplifier circuit includes three operational amplifiers 80, 82 and 84 which, by way of example, may be commercially available TLC 272 units. The signal from the piezoelectric crystal is coupled by capacitor C1 to the positive pin 3 of the operational amplifier 80, this pin also being connected to ground by the resistor R2. Pin 2 of amplifier 80 is tied to ground by resistor R1, and this pin is also tied to pin 1 by a resistor R5. The output of the crystal 29 is coupled by capacitor C2 and resistance R3 to the negative input pin 6 of the operational amplifier 82. Pin 6 is connected to output pin 7 by resistance R6, and positive pin 5 is connected by resistance R4 to ground. The output pins 1 and 7 of the operational amplifiers 80 and 82 are tied to the negative input pin 2 of the operational amplifier 84. Pin 2 is connected to ground by resistance R8, and it is connected to the output pin 1 by resistor R9. Positive pin 3 of operational amplifier 84 is connected to the variable resistor VR1 which has its opposite terminals connected to ground and coupled to the power supply by resistance R7. The variable resistor VR1 is important because it enables the user to set the threshold level at which signals will be sent to trigger the position recording components of the coordinate measuring machine. The output of operational amplifier 84 is connected to resistor R10 which leads to ground via a normally open overtravel switch. The contacts of this switch are the triangular plate 26 of the carrier and the lower end of the spring 45 which are shown best in FIG. 2.

The absolute value amplifier circuit is mounted on a single circuit board which is located within the probe's housing. As previously explained, the electrical connector leading from the probe housing comprises three concentric rings. In this regard, and referring to FIG. 5, the outer ring is the power supply to the circuit board. The middle rings of the connectors are grounded, and there is a capacitor C3 which connects between two of these rings. The output signal is transmitted through the center ring to the timer and to the position recording components of the coordinate measuring machine. This signal passes through a diode D1 to pin 2 of a timer block 86 which may be an integrated circuit of the type commercially available under the designation LM555 or LM555C. Pin 2 is coupled to ground by resistor R13. The power supply in line 88 is tied to the reset and power supply pins 4 and 8, and the power supply is also coupled by variable resistor VR2 to the discharge and threshold pins 6 and 7. The latter are connected to ground by the external capacitor C4.

The output pin 3 of timer 86 is tied to the optical isolator D3 to provide the signal to the measurement-recording components of the machine. The opposite side of optical isolator D3 is coupled by resistor R12 to the power supply line 88.

To prevent retriggering of the timer 86 when the probe carrier returns to its seated or normal rest position, the circuit preferably includes a disabling timer 90 which may also be an LM555 or LM555C unit. Its trigger pin 2 is connected by capacitor C5 to the output pin 3 of timer 86, and it is also coupled to the power supply line by resistor R11. The disabling timer 90 has its reset and power supply pins connected to power supply line 88. Its threshold and discharge pins are connected to the power supply line by variable resistor VR3 and to ground by the external capacitor C6. The output pin 3 is coupled by a diode D2 to the output pin 3 of the timer 86.

Briefly summarizing the operation of the circuit, the operational amplifiers 80 and 82 amplify the signal generated by the piezoelectric crystal 29 when it detects an impact between the stylus and the workpiece. Due to the opposite polarities in the connections to the operational amplifiers 80 and 82, the signal will be amplified whether it is negative or positive, and the amplified signal will then go to the negative input pin of the operational amplifier 84. The threshold voltage at which an output signal will be provided from the operational amplifier 84 can be adjusted by changing the setting of the variable resistor YR1. When this threshold is reached, the operational amplifier 84 will provide a signal to the timer 86, and this signal is maintained at the output pin 3 of timer 86 until a first interval of time has passed. The duration of this interval is adjustable by changing the setting of the variable resistor VR2, a suitable duration being long enough to maintain the signal until after the triangular plate 26 contacts the spring 45. When the timer 86 turns off, capacitor C5 sends a pulse to the disabling timer 90 in order to provide, via diode D2, a signal to the input pin 2 of timer 86 in order to prevent the timer 86 from reactivating. The duration that the disabling timer 90 operates is adjustable by changing the setting of variable resistor VR3. Preferably, this should be long enough so that the carrier can reseat itself before the disabling timer turns off to restore the timer 86 to its normal state where it is ready to receive a further signal.

Although there are many mechanical and/or electronic devices which are capable of performing the functions of the circuit shown in FIG. 5, it is mentioned here by way of example that the diodes may be of a type 1N914 and that the other circuit components may have the following values:

| Component | Value |
|---|---|
| C1, C2 | .01 M |
| C3, C6 | 0.1 M |
| C4 | 2.2 M |
| C5 | .01 u |
| R1, R2, R3, R4, R8 | 100K |
| R5 | 6.8 M |
| R6, R11, R13 | 10K |
| R7 | 220K |
| R9 | 1 M |
| R10 | 100 Ohms |
| R12 | 270 Ohms |
| VR1 | 100K |
| VR2, VR3 | 1 M. |

Another suitable circuit which eliminates unwanted signals attributable to continued contact between the stylus and the workpiece is a Schmitt trigger which is triggered by the initial signal from the piezoelectric crystal. The principle of the Schmitt trigger circuit is that a signal of a sufficient magnitude will change the state of an amplifier. The amplifier output stays in the changed state until the amplifier receives another signal of equal or greater magnitude which will then cause its state to change again. Such a circuit, properly adjusted, will electrically mask any smaller signals created after initial contact, and it can be adjusted so that the signals produced when the carrier reseats will turn the signal off. With this arrangement, the internal spring contact can be omitted and the value of the timer components of the circuit are less important.

Persons familiar with the field of the invention will realize that this disclosure represents a number of important steps forward in this field. It will be recognized that the invention may be practiced by a variety of devices which differ in many respects from the exemplary embodiments shown herein. Therefore, it is emphasized that the invention is not limited only to these embodiments but is embracing of modifications thereto and variations thereof which fall within the spirit of the following claims.

We claim:

1. A probe assembly for connecting a stylus to the head of a coordinate measuring machine and for sensing a position where the stylus touches a workpiece, said probe assembly comprising,
    a housing,
    means for connecting the housing to the head of a coordinate measuring machine,
    a carrier which is supported on said housing,
    means for connecting a workpiece-contacting stylus to the carrier,
    positioning means for retaining the carrier at a precise normal rest position relative to the housing, said carrier being movable from said rest position when it is subjected to external forces,
    means for detecting contact between the stylus and a workpiece, said detecting means including a piezoelectric crystal means which is mounted on said carrier, said crystal means being operable to produce a signal when the carrier receives an impact from the stylus and before the carrier moves from said rest position,
    electronic circuit means for receiving said signal and providing an output signal which is greater than and substantially simultaneous with said signal from the crystal means, said electronic circuit means including an absolute value circuit.

2. A probe assembly according to claim 1 in combination with a stylus which is connected to said carrier and a coordinate measuring machine which has its head connected to said housing.

3. A probe assembly according to claim 1 wherein the carrier has a shaft which has a longitudinal axis, said crystal means lying on said longitudinal axis.

4. A probe assembly according to claim 1 wherein the electronic circuit means is located inside said housing and includes a potentiometer with a movable adjustment member, said housing having an access opening aligned with the movable adjustment member to permit insertion of a tool into the housing for adjustment of the potentiometer.

5. A probe assembly according to claim 2 comprising at least one operational amplifier means, means connecting the operational amplifier means to the crystal means, said crystal means being operable to amplify the signal from the crystal means.

6. A probe assembly according to claim 5 wherein the connecting means includes a capacitor.

7. A probe assembly according to claim 1 wherein the electronic circuit means includes a voltage comparator with a potentiometer connected thereto, said potentiometer being adjustable to change the threshold at which said voltage comparator will provide an output signal.

8. A probe assembly according to claim 1 wherein the circuit means includes a first timer means for maintaining an output signal for a first time interval after the signal is produced by the crystal means.

9. A probe assembly according to claim 8 wherein the first timer means is adjustable to change the duration of the first time interval.

10. A probe assembly according to claim 8 including movement sensing means for detecting the displacement of said carrier from said normal rest position, said movement sensing means being operable during said first time interval whereby said first timer means maintains the output signal to permit the head to move until the carrier moves from its move rest position.

11. A probe assembly according to claim 8 including a second timer means which prevents the transmission of an output signal from the circuit means for a second time interval, and means for actuating said second timer means at the end of the first time interval, whereby the second timer means prevents an output signal when the carrier arrives back at its normal rest position.

12. A probe assembly according to claim 1 including movement sensing means which, after said signal is produced, detects the displacement of the carrier from said normal rest position.

13. A probe assembly according to claim 1, wherein the housing has an upper end cap provided with an insulating member, at least three concentric rings of conductive material supported on said insulating member for making electrical connections between the probe and the head of a measuring machine.

14. Measuring apparatus, comprising,
a piezoelectric crystal means which is mounted on a carrier, said crystal means being operable to produce a signal when the carrier receives ann impact,
electronic circuit means for receiving said signal and providing an output signal which is greater than and substantially simultaneous with said signal from the crystal means, said electronic circuit means including an absolute value circuit, and
adjustable means for changing a threshold value of said signal from the crystal means at which said electronic circuit will provide an output signal.

15. Measuring apparatus according to claim 14, wherein said electronic circuit means includes a voltage comparator with a potentiometer connected thereto, said potentiometer comprising said adjustable means.

16. Measuring apparatus according to claim 14 wherein the circuit means includes a first timer for maintaining an output signal for a first time interval after the signal is produced by the crystal means.

17. Measuring apparatus, comprising,
a piezoelectric crystal means which is mounted on a carrier, said crystal means being operable to produce a signal when the carrier receives an impact,
electronic circuit means including at least one operational amplifier means for amplifying the signal from the crustal means, said electronic circuit means including an absolute value circuit, capacitor means connecting the operational amplifier means to the crystal means, said operational amplifier means being operable to amplify the signal from the crystal means.

18. Measuring apparatus according to claim 17, wherein said electronic circuit means includes a voltage comparator with a potentiometer connected thereto, said potentiometer being adjustable to change the threshold at which said voltage comparator will provide an output signal.

19. Measuring apparatus according to claim 17 wherein the circuit means includes a first timer for maintaining an output signal for a first time interval after the signal is produced by the crystal means.

20. Measuring apparatus according to claim 19 wherein the first timer means is adjustable to change the duration of the first time interval.

21. Measuring apparatus, comprising,
a piezoelectric crystal means which is mounted on a carrier, said crystal means being operable to produce a signal when the carrier receives an impact,
electronic circuit means for receiving said signal and providing an output signal which is greater than and substantially simultaneous with said signal from the crystal means,
said circuit means including a first timer means for maintaining an output signal for a first time interval after the signal is produced by the crystal means.

22. Measuring apparatus according to claim 21 wherein the first timer means is adjustable to change the duration of the first time interval.

23. Measuring apparatus according to claim 21 wherein the carrier has a normal rest position from which it is displaceable, said apparatus including movement sensing means for detecting the displacement of said carrier from said normal rest position, said movement sensing means being operable during said first time interval whereby said first timer means maintains the output signal to permit the head to move until the carrier moves from its normal rest position.

24. Measuring apparatus according to claim 21 including a second timer means which prevents the transmission of an output signal from the circuit for a second time interval and means for actuating said second timer means at the end of the first time interval, whereby the second timer means prevents an output signal when the carrier arrives back at its normal rest position.

25. A probe assembly for connecting a stylus to the head of a coordinate measuring machine and for sensing a position where the stylus touches a workpiece, said probe assembly comprising,
a housing,
means for connecting the housing to the head of a coordinate measuring machine,
a carrier which is supported on said housing,
means for connecting a workpiece-contacting stylus to the carrier,
positioning means for retaining the carrier at a precise normal rest position relative to the housing, said carrier being movable from said rest position when it is subjected to external forces,
means for detecting contact between the stylus and a workpiece, said detecting means including a piezoelectric crystal means which is mounted on said carrier, said crystal means being operable to produce a signal when the carrier receives an impact from the stylus and before the carrier moves from said rest position,
electronic circuit means for receiving said signal and providing an output signal which is greater than and substantially simultaneous with said signal from the crystal means, said circuit means including a first timer means for maintaining an output signal for a first time interval after the signal is produced by the crystal means.

26. A probe assembly according to claim 25 combination with a stylus which is connected to said carrier and a coordinate measuring machine which has its head connected to said housing.

27. A probe assembly according to claim 25 wherein the carrier has a shaft which has a longitudinal axis, said crystal means lying on said longitudinal axis.

28. A probe assembly according to claim 25 wherein the electronic circuit means is located inside said housing and includes a potentiometer with a movable adjustment member, said housing having an access opening aligned with the movable adjustment member to permit insertion of a tool into the housing for adjustment of the potentiometer.

29. A probe assembly according to claim 25 comprising at least one operational amplifier means, means for connecting the operational amplifier means to the crystal means, said crystal means being operable to amplify the signal from the crystal means.

30. A probe assembly according to claim 29 wherein the connecting means includes a capacitor.

31. A probe assembly according to claim 25 wherein the electronic circuit means includes an absolute value circuit.

32. A probe assembly according to claim 31 wherein the electronic circuit means includes a voltage comparator with a potentiometer connected thereto, said potentiometer being adjustable to change the threshold at which said voltage comparator will provide an output signal.

33. A probe assembly according to claim 25 wherein the first timer means is adjustable to change the duration of the first time interval.

34. A probe assembly according to claim 25 including movement sensing means for detecting the displacement of said carrier from said normal rest position, said movement sensing means being operable during said first time interval whereby said first timer means maintains the output signal to permit the head to move until the carrier moves from its normal rest position.

35. A probe assembly according to claim 25 including a second timer means which prevents the transmission of an output signal from the circuit means for a second time interval, and means for actuating said second timer means at the end of the first time interval, whereby the second timer means prevents an output signal when the carrier arrives back at its normal rest position.

36. A probe assembly according to claim 25 including movement sensing means which, after said signal is produced, detects the displacement of the carrier from said normal rest position.

37. A probe assembly according to claim 25 wherein the housing has an upper end cap provided with an insulating member, at least three concentric rings of conductive material supported on said insulating member for making electrical connections between the probe and the head of a measuring machine.

38. Measuring apparatus, comprising,
a piezoelectric crystal means which is mounted on a carrier, said crystal means being operable to produce a signal when the carrier receives an impact,
electronic circuit means for receiving said signal and providing an output signal which is greater than and substantially simultaneous with said signal from the crystal means, said circuit means including a first timer for maintaining an output signal for a first time interval after the signal is produced by the crystal means, and
adjustable means for changing a threshold value of said signal from the crystal means at which said electronic circuit will provide an output signal.

39. Measuring apparatus, comprising,
a piezoelectric crystal means which is mounted on a carrier, said crystal means being operable to produce a signal when the carrier receives an impact,
electronic circuit means including at least one operational amplifier means for amplifying the signal from the crystal means, capacitor means connecting the operational amplifier means to the crystal means, said operational amplifier means being operable to amplify the signal from the crystal means, said circuit means including a first timer for maintaining an output signal for a first time interval after the signal is produced by the crystal means.

40. Measuring apparatus according to claim 39 wherein the first timer means is adjustable to change the duration of the first time interval.

* * * * *